United States Patent [19]

Sasabe et al.

[11] 3,851,094

[45] Nov. 26, 1974

[54] IMAGE PICK-UP-DISPLAY SYSTEM

[75] Inventors: Kaoru Sasabe; Hiroaki Kotera; Takashi Misaki; Toshihide Hane, all of Osaka, Japan

[73] Assignee: Matsushita Electric Industrial Company, Limited, Osaka, Japan

[22] Filed: July 19, 1972

[21] Appl. No.: 273,077

[30] Foreign Application Priority Data

| | | |
|---|---|---|
| July 26, 1971 | Japan | 46-56212 |
| July 27, 1971 | Japan | 46-56622 |
| Aug. 7, 1971 | Japan | 46-59678 |
| Sept. 8, 1971 | Japan | 46-69888 |
| Sept. 8, 1971 | Japan | 46-69889 |
| Sept. 8, 1971 | Japan | 46-69891 |
| Sept. 9, 1971 | Japan | 46-70194 |

[52] U.S. Cl. .......................... 178/6.8, 178/DIG. 25

[51] Int. Cl. .......................... H04n 5/14

[58] Field of Search .......... 178/6.8, 5.2 A, DIG. 25, 178/5.4 F, 5.4 H

[56] References Cited

UNITED STATES PATENTS

| | | | |
|---|---|---|---|
| 2,214,072 | 9/1940 | Biedermann | 178/5.2 A |
| 2,700,697 | 1/1955 | Houghton | 178/5.4 F |
| 2,713,605 | 7/1955 | Bradley | 178/5.4 F |
| 2,905,755 | 9/1959 | Neale | 178/5.2 A |
| 3,213,190 | 10/1965 | Mutschler | 178/5.4 F |

*Primary Examiner*—Howard W. Britton

[57] ABSTRACT

An image pick-up and display system for picking up and displaying picture information carried on a recording medium comprising, a displayer for producing on a screen a vertically and horizontally moving light-spot of flying-spot having a luminous intensity in dependence on a flying-spot intensity control signal, the screen facing the recording medium so that the flying-spot is intensity-modulated by the picture information, a photo-electric converter such as photo-multiplier for converting the intensity-modulated flying-spot into an electric image signal, and a feed-back circuit for producing the intensity control signal in accordance with the image signal and for feeding-back the intensity control signal to the flying-spot generator so that the original picture information is reproduced on the screen.

2 Claims, 14 Drawing Figures

IMAGE PICK-UP-DISPLAY SYSTEM

The present invention relates to image pick-up and display systems and, more particularly, to an image pick-up and reproduction system for picking up and reproducing image or picture information carried on a recording medium such as a paper sheet or photosensitive film.

Various image pick-up and display systems have been, heretofore, devised for picking up and reproducing the image or picture information on the recording medium. On of those systems includes an image pick-up or camera tube for converting the picture information into an electric signal, and a display or picture tube for re-converting the electric signal into the original picture information. Another system includes a display tube for scanning the recording medium by a flying-spot produced therein so as to intensity-modulate the flying-spot with the picture information, a photosensitive device such as photomultiplier for converting the intensity-modulated flying-spot into an electric signal, and a display or picture tube for reconverting the electric signal into the original picture information.

The above-stated systems are disadvantageous in that those are generally costly due to the complicated constructions thereof since, for example, the systems should includes means for establishing synchronization between the camera tube and the display tube.

It is, accordingly, an object of the invention to provide an improved image pick-up and reproduction system having a simple construction and accordingly economical.

It is another object to provide an image pick-up and reproduction system which can pick-up and reproduce picture information carried on a recording medium with a high resolution power.

It is a further object to provide an image pick-up and reproduction system which can reproduce the picked-up picture information with reduced flickering.

It is a still further object to provide an image pick-up and reproduction system which can carry out mutual communication.

All of the objects, features and advantages of the invention and the manner of attaining them will become more apparent and the invention itself will be best understood by reference to the following description of embodiments of the invention taken in conjunction with the accompanying drawings, in which.

Figures 1, 2, 3:
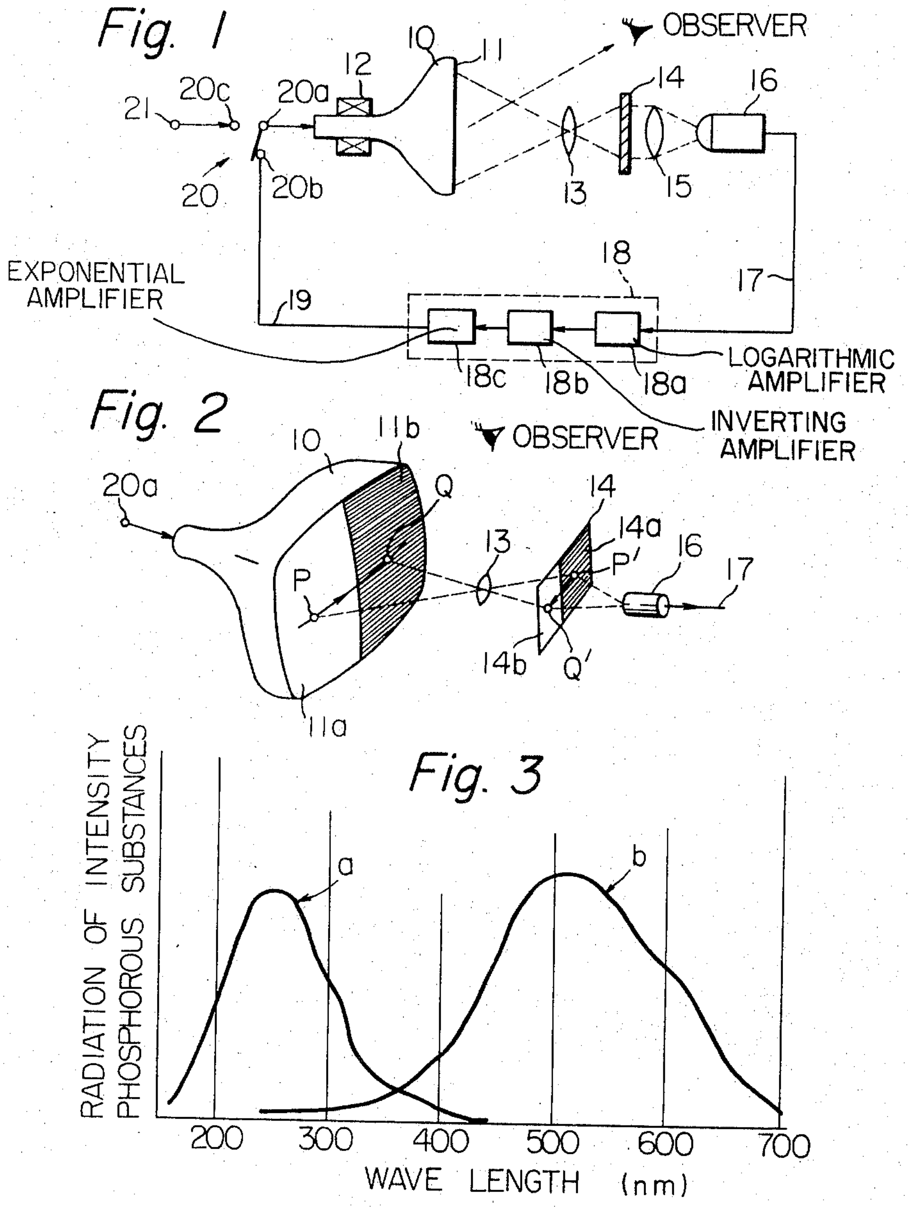
FIG. 1 is a schematic block diagram of a preferred embodiment of the invention.
FIG. 2 is a perspective view of a main portion of the system of FIG. 1.
FIG. 3 is a graph showing radiation spectrum of phosphorous substances.

Referring now to the drawings and more specifically to FIG. 1, there is shown an image pick-up and display system which comprises a display or picture tube 10. The picture tube 10 has a faceplate 11 the inner surface of which is coated with a phosphorous material and an electron gun positioned in the neck portion of the envelope thereof directed to the faceplate 11 to permit an electron beam emitted from the electron gun to impinge on the phosphorous material or layer. Deflection coils 12 are positioned on the envelope so as to horizontally and vertically deflect the electron beam thereby producing a moving light-spot or flying-spot on the faceplate 11. The flying-spot on the faceplate 11 is focussed by an optical arrangement 13, for example, a convex lens onto a recording medium 14 carrying thereon picture information to be picked up. Since, in this case, the recording medium 14 is transparent, the focussed flying-spot passes through the recording medium 14 while being intensity-modulated by the picture information and, then focussed by another optical arrangement 15, for example, a convex lens onto a detecting face of a photo-detector 16 such as a photomultiplier, a photo-transistor or a photo-diode. The photo-detector 16 converts the flying-spot into an electric image signal having voltage corresponding to the intensity of the flying-spot. The image signal from the photo-detector 16 is applied through a line 17 to a feed-back circuit arrangement 18 which in turn produces on a line 19 a flying-spot intensity control signal having a voltage either inversely proportional or inversely proportionate to that of the image signal on the line 17. The line 19 is connected to a stationary contact 20*b* of a switch 20 and, accordingly, the control signal on the line 19 is delivered through a movable contact 20*a* to an intensity control element (not shown) such as first grid of the picture tube 10 when the movable contact 20*a* is slanted to the *b* side. Since the intensity of the flying-spot is regulated according to the intensity control signal representing the picture information on the recording medium 14, the picture information is reproduced on the faceplate 11 of the picture tube 10. The reproduced picture information on the faceplate 11 can be observed by an observer as shown in the figure. It should be now understood that a usual video signal applied to an input terminal 21 can be reproduced on the faceplate 11 by connecting the movable contact 20*a* to a stationary contact 20*c*. It should be noted that the picture tube 10 may be replaced by any other optical device producing a flying-spot, such as, a photo-diode matrix or a liquid crystal plate.

Referring now to FIG. 2, the operation of the system of FIG. 1 will be described in more detail hereinbelow.

When the flying-spot of the picture tube 10 lies at a point P on the faceplate 11, the flying-spot is focussed through the optical arrangement 13 onto a point P′ on a dark portion 14*a* of the recording medium 14 and therefore the flying-spot with a reduced intensity is picked up by the photo-detector 16 which then produces the image signal having a reduced voltage. The feed-back circuit 18 receives the image signal and produces the intensity control signal with an increased voltage which is applied through the switch 20 to the intensity control element of the picture tube 10. When, in this instance, the intensity control element is arranged to regulate the intensity of the flying-spot in proportion to the magnitude of the voltage of the control signal, the flying-spot at the point P has an increased intensity. When the flying-spot moves from the point P to a point Q, the flying-spot is focussed onto a point Q' on a light portion 14*b* of the recording medium 14 and, accordingly, the photo-detector 16 picks up the flying-spot having an increased intensity and produces the image signal having a increased voltage. Therefore, the flying-spot at the point Q has a decreased intensity. As a result, the picture information is inversely reproduced on the faceplate 11 wherein the portions 11*a* and 11*b* respectively correspond to the portions 14*a* and 14*b* of the picture information.

Although the feed-back circuit arrangement 18 and the intensity control element of the picture tube 11 are arranged to constitute a negative feed-back loop in the above description, these can, of course, be arranged to constitute a positive feed-back loop. When so arranged, the intensity of the flying-spot lying at a point on the faceplate 11 corresponding to a light point lighter than a preselected threshold level of the recording medium 14 is increased to a saturation level through positive feed-back and, on the contrary, the intensity of the flying-spot lying at a point corresponding to a dark point darker the threshold level of the recording medium 14 is reduced to a minimal level. The picture information is, therefore, reproduced in an increased contrast although it is impossible to prepare half tone. The threshold level may be selected as desired. It is, on the other hand, necessary to provide in the positive feed-back loop a stabilizer for preventing the flying-spot from having a saturated maximum intensity at any point on the faceplate 11 due to external illumination. The stabilizer may be a gate for cutting off the output terminal of the photo-detector 16 when the intensity of flying-spot is saturated. The stabilizer may be either a chopper for chopping at a constant rate the output image signal of the photo-detector 16 or a limiter for limiting the level of the output image signal of the photo-detector 16. A certain d-c bias may be superposed on the image signal of the photo-detector 16 so as to maintain the intensity of the flying-spot at a minimal level even if no incident ray exite the photo-detector 16.

It is, in this instance, to be noted that the control signal may be suitably processed and applied to the deflection coils which then regulate the deflection speed of the electron beam in the picture tube 10 so that the intensity of the flying-spot on the faceplate 11 is veried in dependence on the control signal.

Turning back to FIG. 1, the feed-back circuit arrangement 18 will be described in more detail hereinbelow.

The feed-back circuit arrangement 18 includes a logarithmic amplifier 18*a* having an input connected to line 17, an inverting amplifier 18*b* having an input connected to an output of the logarithmic amplifier 18*a*, and an exponential amplifier 18*c* having an input connected to an output of the inverting amplifier 18*b* and an output connected to the line 19. The logarithmic amplifier 18*a* produces an output voltage $\log_{10}E$ when received input voltage E. The inverting amplifier 18*b* has a negative gain −A. The exponential amplifier 18*c* produces an output voltage $10^E$ when received an input voltage E.

It is well known in the art that when an assumption is made that darkness and transmissivity of the recording medium 14 are respectively represented by $D(x,y)$ and $T(x,y)$ the following equation is obtained, $$D(x,y) = \log_{10} [1/T(x,y)] \tag{1}$$

When, in this instance, the intensity of the radiation from the flying-spot is expressed by $I_i(t)$ and the position of the flying-spot is expressed by $(x(t), y(t))$ the intensity $I_t(t)$ of the flying-spot passed through the recording medium 14 is given by, $$I_t(t) = I_i(t)T(x(t), y(t))$$

where $t$ represents the time.

Using the equation 1, $$I_t(t) = I_i(t)10^{-D(x(t),\ y(t))} \tag{2}$$

A photo-current $I_p(t)$ generated by the photodetector 16 is expressed as, $$I_p(t) = C_p \cdot I_t(t) \tag{3}$$

where $C_p$ represents the responsiveness of the photodetector 16.

The photo-current $I_p(t)$ is delivered through the line 17 to the input of the logarithmic amplifier 18*a* which then produces an output signal having a voltage $e_1$ expressed as, $$e_1 = \log_{10} I_p(t) \tag{4}$$

The inverting amplifier 18*b* then produces an output signal having a voltage $e_2$ expressed as, $$e_2 = -A \cdot e_1 = -A \cdot \log_{10} I_p(t) \tag{5}$$

The exponential amplifier 18*c* then produces an output signal, namely, the control signal having a voltage $e_3$ expressed by, $$e_3 = e^{-A\log_{10}} I_p(t) \tag{6}$$

The control signal is then applied to the intensity control element of the picture tube 10 so that the flying-spot has an intensity $I_{spot}(t)$ expressed by, $$I_{spot}(t) = C_T \cdot e_3 \tag{7}$$

when the optical arrangement 13 transmits light rays from the flying-spot at a ratio $\eta$ to the recording medium 14, the following equation can be obtained, $$I_i(t) = \eta \cdot I_{spot}(t) \tag{8}$$

Using the equations 2 through 7, the equation 8 becomes $$I_i(t) = C_T 10^{-A \log 10\{C_p \cdot \eta \cdot I_{spot}(t) \cdot 10^{-D(x(t), y(t))}\}} \quad (9)$$

Hence, $$\log_{10} I_{spot}(t) = [A\{D(x(t),y(t)) - \log_{10}(C_p \cdot \eta\} + \log_{10} C_T]/(1 + A) \quad (10)$$

When the absolute value A of the gain of the inverting amplifier 18*b* is sufficiently large, the equation 10 is expressed as, $$\log_{10} I_{spot}(t) \approx D(x(t),y(t)) - \log_{10}(C_p \cdot \eta) \quad (11)$$

Hence, $$I_{spot}(t) \approx K_{10} D(x(t),y(t)) \quad (12)$$

where $K = 1/C_p \cdot \eta$.
Therefore, using the equation 1

$$I_{spot}(t) = K \cdot T^{-1} \quad (13)$$

It is apparent from the equation 13 that the picture information on the recording medium 14 is invertedly reproduced on the faceplate 11 with an extremely high fidelity.

It should be, in this instance, understood that the circuit arrangement 18 may includes any other non-linear circuit for producing a non-linear function of the image signal.

Furthermore, it is to be noted that the circuit arrangement 18 may includes merely the inverting amplifier 18*b* or a differential amplifier so that the circuit arrangement 18 produces the control signal with a voltage inversely proportional to that of the image signal from the photo-detector 16.

It should be now noted that the phosphorous material to be coated on the inner surface of the faceplate 11 should have a preferably short after-glow interval in order to reproduce an optical image on the faceplate 11 with a high resolution power. When, however, the phosphorous material has a short after-flow interval, unwanted flickering may affect the reproduced image on the faceplate 11.

Figures 4A, 4B, 5:
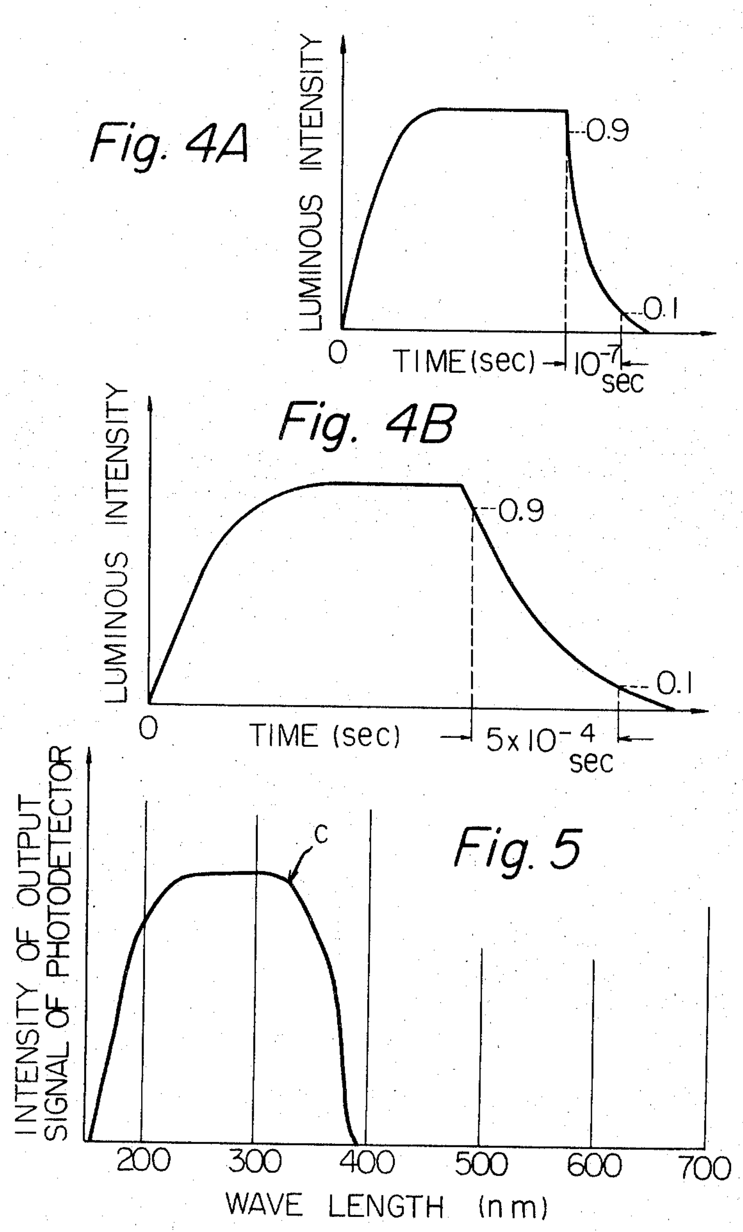
FIGS. 4A and 4B are graphs showing responsivenesses of phosphorous substances.
FIG. 5 is a graph showing sensitivity of a photo-detector.

In order to solve the above-stated problem, the phosphrous layer formed on the inner surface of the faceplate 11 of the picture tube 10 is composed of two kinds of phosphorous substances A and B respectively having radiation characteristics illustrated by curves *a* and *b* in a graph of FIG. 3A wherein abscissa and ordinate axes respectively represent the wave-length of incident rays and radiation intensity of phophorous substances. It is apparent from the graph of FIG. 3A that the substance A mainly produces ultraviolet rays which is invisible and the substance B produces visible rays. FIGS. 4A and 4B respectively illustrate responsivenesses of the substances A and B, where the abscissa and ordinate axes respectively represent the time and luminous intensity of the radiation from the substances. The substance A has such a short after-glow interval as $10^{-7}$ seconds and, on the other hand, substance B has such a large after-glow interval as $5 \times 10^{-4}$ seconds. In addition, the photo-detector 16 is selected to have a sensitivity as illustrated by a curve *c* in a graph of FIG. 5 in which abscissa and ordinate axes respectively represent the wavelength of incident rays and intensity of output signal of the photodetector 16. With the above-stated arrangement, the photodetector 16 picks up only the radiation emanated from the substance A, so that the intensity of the flying-spot is regulated through the feed-back loop without unwanted flickering.

Figures 6, 7A, 7B:
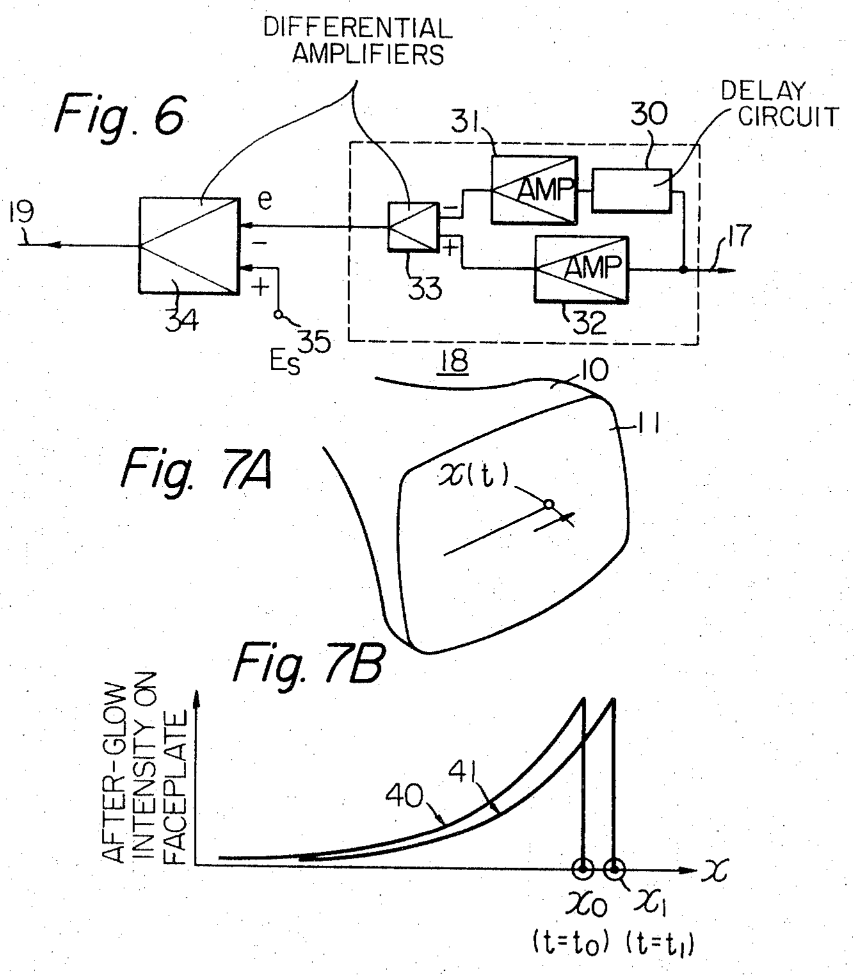
FIG. 6 is a block diagram of another preferred arrangement of a feed back circuit of the system of FIG. 1.
FIG. 7A is a view diagramatically showing a display tube in the system of FIG. 1.
FIGS. 7B through 7D are graphic illustrations of the persistence of the flying-spot on the faceplate of the display tube.

FIG. 6 illustrates another feed-back circuit arrangement according to the invention, which includes a delay circuit 30 having input terminal to be connected to the line 17, a first amplifier 31 having an input terminal connected to an output terminal of the delay circuit 30, a second amplifier 32 having an input terminal connected to the input terminal of the delay circuit 30, a first differential amplifier 33 having two input terminals respectively connected to output terminals of first and second amplifier 31 and 32, and a second differential amplifier 34 having one input terminal connected to an output terminal of the first amplifier 33 and the other input terminal connected to a reference voltage terminal to which a reference voltage $E_s$ is impressed. An output terminal of the second differential amplifier 34 is to be connected to the line 19.

The operation of the feed-back circuit arrangement of FIG. 6 will be explained hereinbelow in conjunction with FIGS. 7A to 7D.

It is now assumed that the horizontal position of the flying-spot is given by $x(t)$ and $x$ coordinate is directed along the horizontal scanning direction of the flying-spot, as shown in FIG. 7A. It is also assumed that $x(t_o) = x_0$ and $x(t_1) = x_1$.

When the flying-spot on the faceplate 11 has a constant intensity the after-glow of the phophorous layer distributes along the $x$ axis as shown by curves 40 and 41 in FIG. 7B since the phosphorous material has an exponential after-glow characteristics.

Figure 7C:
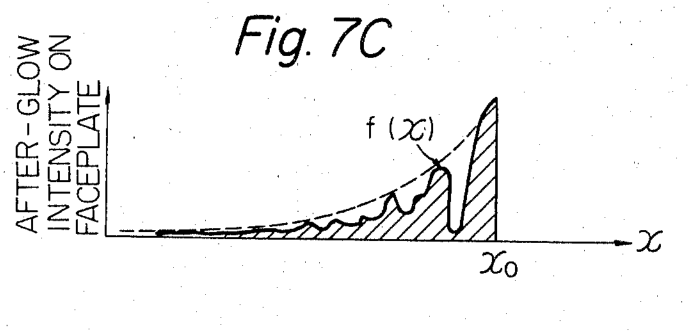
Figure 7D:
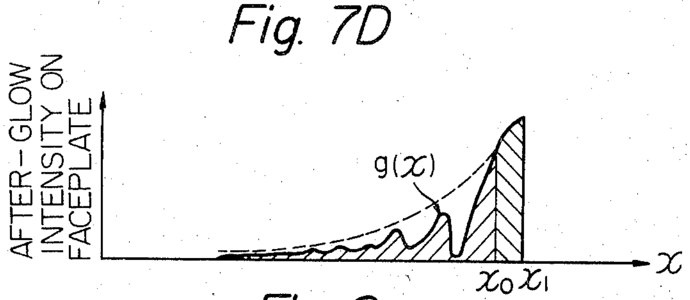

Since, in operation, the flying-spot is intensity modulated by the picture information, the after-glow of the phophrous layer distributes along the $x$ axis as shown by curves $f(x)$ and $g(x)$ in FIGS. 7C and 7D. Since the after-glow of the phosphorous material generally exponentially decreases, $g(x)$ is proportionate to $f(x)$, viz., $$f(x) \propto g(x) \qquad (x \leqq x_0) \quad (14)$$

Since the photo-detector 16 detects not only light rays emitted from the flying-spot but also light rays from the after-glow, the output voltage $e_p$ of the photodetector 16 is proportional to accumulation or integration of the distribution function $f(x)$ or $g(x)$. When it is assumed that the voltage $e_p$ is expressed by $e_{p0}$ when $x = x_0$, then $e_{p0}$ is given by:

$$e_{p0} = \int_{-\infty}^{x_0} f(x)\,dx \quad (15)$$

When, on the other hand, $x = x_0$, $e_p$ is expressed by $e_{p1}$, then $$e_{p1}=\int_{-\infty}^{x_1} g(x)dx \quad (16)$$

As far as $x$ is smaller than $x_0$, the following equation is obtained from the equation 14, $$f(x) = kg(x) \quad (17)$$

where $k$ is a constant. Substituting the equation 17 for the equation 15, $$e_{p1}=K\int_{-\infty}^{x_0} g(x)dx \quad (18)$$

On the other hand, $$e_{p1}=\int_{-\infty}^{x_0} g(x)dx+\int_{x_0}^{x_1} g(x)dx$$

hence, $$ke_{p1}-e_{p0}=K\int_{x_0}^{x_1} g(x)dx \quad (19)$$

It is apparent from the equation 19 that the value $(ke_{p1} - e_{p0})$ is proportional to luminous intensity of a picture element of the image reproduced on the faceplate 11 when the value $(x_1 - x_0)$ is selected to represent one picture element.

When, in operation, the output voltage $e_{p1}$ is applied through the line 17 to the delay circuit 30, the delay circuit 30 delays the input voltage by a time $(t_1 - t_0)$ so that a voltage equal to the voltage $e_{p0}$ is produced on the output terminal of the delay circuit 30. The voltages $e_{p0}$ and $e_{p1}$ are respectively amplified by the first and second amplifiers 31 and 32 and are applied to the differential amplifier 33 which then produces an output voltage corresponding to the value $(ke_{p1} - e_{p0})$. The differential amplifier 34 compares the output voltage from the amplifier 33 with the reference voltage $E_s$ and produces the control signal on the line 19. As is apparent from the above description, the control signal from the amplifier 34 is dependent only upon the intensity of one picture element on the faceplate even if the phosphorous layer emanates after-glow radiation. It should be understood that one of the first and second amplifiers 31 and 32 can be omitted, if desired.

It is now apparent that in the system of FIG. 1, the various elements interposed between the faceplate 11 and the photodetector 16 should be shielded from external illumination so as to permit the system to correctly operate. The various element may be therefore surrounded by a suitable hood. A half mirror may be provided in front of the faceplate for the purpose of observation. The system of FIG. 1 may be, in practice, relatively large in construction and may have a limited observation angle. In order to solve the above problem, another system has been provided by the invention, which is shown in FIG. 8.

Figures 8, 9:
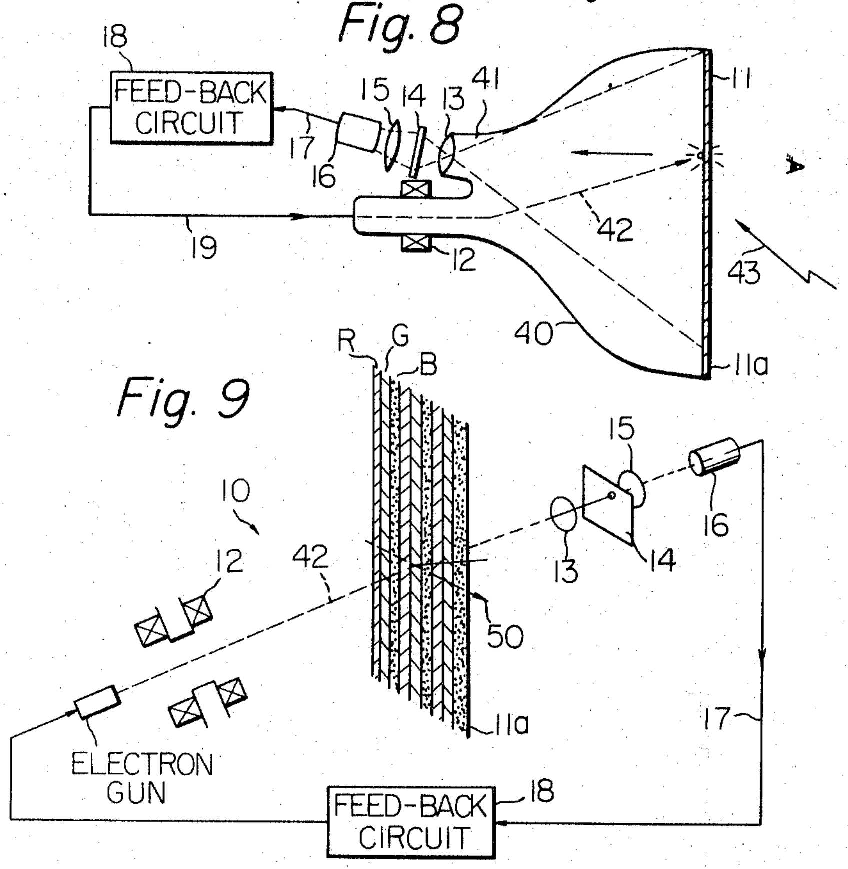
FIG. 8 is a sectional view of another embodiment of the invention.
FIG. 9 is a view diagramatically showing still another system of the invention for processing color picture information.

The system of FIG. 8 includes an improved display tube 40 having the same elements as a usual display cathode-ray tube except that the tube 40 has an aperture 41 formed at a portion of the envelope near to the neck portion and viewing a phosphorous layer 11$a$. When, in operation, an electron beam emitted from the electron gun (not shown) positioned in the neck portion advances along a broken line 42 and bombards the phosphorous layer 11$a$ to produce a flying-spot, the radiation emitted from flying-spot returns back to an optical arrangement 13 formed in the aperture 41. The radiation is then focussed onto a recording medium 14 carrying picture information and positioned in front of the optical arrangement 13. The radiation passed through the recording medium 14 is focussed by a optical arrangement 15 onto a photo-detector 16 which then produces on a line 17 an electric signal in accordance with the intensity of the radiation applied thereto. The electric signal on the line 17 is applied to a feed-back circuit arrangement 18 which has the same function as that of the system of FIG. 1. The feed-back circuit arrangement 18 therefore produces a control signal in accordance with the electric signal. The control signal from the feed-back circuit arrangement 18 is delivered through a line 19 to a intensity control element (not shown) of the display tube 40. As is apparent, the operation of the system of FIG. 8 is the same as that of the system of FIG. 1.

Being thus arranged, even if an external light ray as indicated by an arrow 43 is irradiated onto the faceplate 11, the light ray is shut off by the phophorous layer 11$a$ so that the system is not affected by the light ray 43. The external light ray 43 is more effectively shut off when either a metal-back or a black screen is formed on the phophorous layer 11$a$. It should be now understood that the display tube 40 may be replaced by a combination of a luminescent element such as laser xenon dischrage tube which generates a light-spot having controllable intensity, a scanner such as a rotatable mirror for repeatedly moving the light spot, and a diffusive translucent screen to be irradiated by the moving light spot.

FIG. 9 diagramatically illustrates another system according to the invention which can pick-up and reproduce color picture information. This system has the same construction as that of the system of FIG. 1 except that the phophorous layer 11$a$ is formed by a plurality of three primary color phophor strips R, G and B arranged in a certain order. The color phosphor layer may be, of course, arranged into any other pattern such as a dot matrix. It should be noted that the display tube has only one electron gun while a usual color picture tube has three electron guns. The electron gun emits an electron beam directed to the color phosphor layer 11$a$ and advancing as indicated by a broken line 42. The deflection coils 12 deflects the electron beam so that the electron beam scans the color phosphor layer 11$a$ as indicated by an arrow 50, whereby a flying-spot colored in one of the primary three colors is generated in the color phosphor layer 11$a$. The recording medium 14, in this embodiment, carries negative color picture information.

When, in operation, the electron beam impinges the red color phosphor strip, the flying-spot colored in red is focussed by the optical arrangement 13 onto a point P of the recording medium 14. When the point P is colored in cyan (complementary to red), the flying-spot passed through the point P has a reduced intensity, so that the photo-detector 16 produces a reduced output voltage on the line 17. When the output signal from the photo-detector 16 is negatively fed back through the circuit arrangement 18 to the display tube 10, the flying-spot glows in an increased intensity. When the flying-spot glows in either green or blue and the point P of the recording mesium 14 colored in cyan, the intensity of the flying-spot is not reduced with the result that the photo-detector 16 produces a large output voltage, whereby the flying-spot glows in a decreased intensity. When the point P is colored in a color complementary to yellow, only the flying-spot colored in blue passes through the point P so that the corresponding portion of the faceplate glows in yellow. It is now apparent from the above description that the system of FIG. 9 can pick up and reproduce color picture information with a high fidelity although the system is so simple in construction. The particular system does not necessitate means for providing *registration* which is necessitated in a usual color image reproduction system. It should be understood that the color phosphor layer may be a combination of a usual monochrome phosphor layer and a color filter placed on the faceplate 11.

Figure 10:
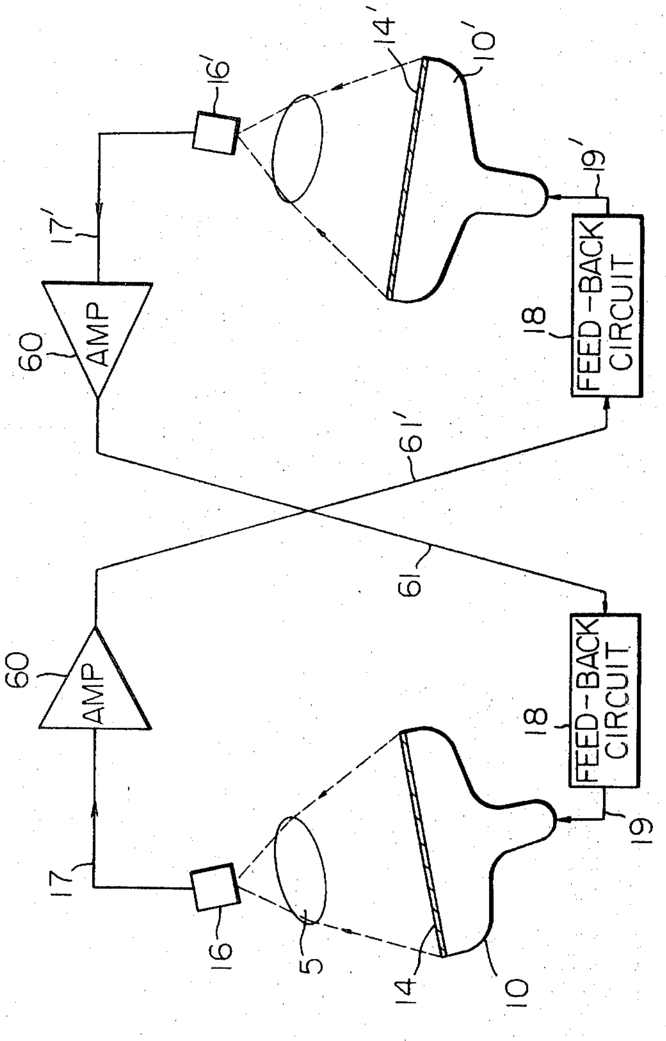
FIG. 10 is a sectional view showing a further embodiment for carrying out mutual communication.

FIG. 10 illustrates still another image pick-up and display system according to the invention, which serves as an overhead projector or carries out mutual communication. The system includes a pair of display tubes 10 and 10' each placed at a suitable position, for example, under a desk. The display tubes 10 and 10' are synchronized with each other in the scanning speed and direction. Transparent recording media 14 and 14' such as transparent paper sheets overlies the faceplates of the display tubes 10 and 10'. Optical arrangements 15 and 15' and photo-detectors are respectively positioned in the vicinity of the faceplates of the display tubes 10 and 10' so as to pick up radiations passed through the recording media 14 and 14'. Output signals of the photo-detectors 16 and 16' are respectively delivered through line 17 and 17' to amplifiers 60 and 60' which amplify the output signals and apply through transmission lines 61 and 61' to feed-back circuit arrangements 18 and 18'. Output signals from the circuit arrangements 18 and 18' are respectively applied through lines 19 and 19' to the intensity control elements (not shown) of the display tubes 10 and 10'.

Being thus arranged, picture information, for example, a written message on the recording medium 14 is reproduced on the faceplate of the display tube 10' and superposed on picture information on the recording medium 14' and can be observed through the recording medium 14'. The superposed picture information is picked up by the photo-detector 16' and reproduced on the faceplate of the display tube 10. The reproduced image on the faceplate of the display tube 10 is superposed on the picture information on the recording medium 14. Any other information can be added by writing in pencil or the like on the recording media 14 and/or 14', which is reproduced by the tubes 10' and/or 10 and superposed on the 14' and/or 14. The display tubes 10 and 10' can be placed at a distance from each other. Furthermore, a time-base compression devices may be prepared in the transmission lines 61 and 61' because of a small information density of written messages. The display tubes 10 and 10' may be replaced by either a screen to be irradiated by laser beam or white screen positioned in a dark chamber and to be scanned by a light-spot. The system of FIG. 10 may includes more than two display tubes, amplifiers and feed-back circuit arrangements and arranged to pick-up and reproduce picture information carried on more than two recording media.

It should be appreciated that the invention system can find various applications such as a projector for a negative plate, photographic film or the like.

It should be apparent from the above description that an improved image pick-up and display system has been provided. The described system is simple, compact and reliable.

It will be understood that the invention is not limited to the exact construction shown and described and that various changes and modifications may be made without departing from the spirit and scope of the invention, as defined in the appended claims.

What is claimed is:

1. Apparatus for the reproduction of an image, comprising:

a cathode ray tube having a layer of white phosphor, means for producing a beam of electrons for scanning said screen to produce a scanning light beam and a visible image, the intensity of said electron beam being dependent upon a control signal supplied to said cathode ray tube;

an object positioned to receive said scanning beam of light emitted by said screen; and a feedback loop including a photosensitive element for producing an electrical signal in response to said light beam passing from said object, means for delaying said signal for the duration of a picture element, means for comparing between said signal and said delayed signal to produce a differential signal, means for amplifying said differential signal for controlling the intensity of said electron beam such that a given increment in the intensity of the light from said object produces an opposite increment in the intensity of the electron beam.

2. Apparatus for the reproduction of images simultaneously on two locations, comprising:

a first cathode ray tube, at one location, having a screen including a layer of phosphor and means for producing a beam of electrons for scanning said screen to produce a scanning light beam and a first visible image;

an object positioned to receive said scanning beam of light emitted by said first cathode ray tube;

a second cathode ray tube, at the other locations, having a screen including a layer of phosphor, means for producing a beam of electrons for scanning said screen to produce a scanning light beam and a second visible image;

a second object positioned to receive the scanning beam of light emitted by said second cathode ray tube;

a first feedback loop including a first photosensitive element for producing a first electrical signal in response to said light beam emitted by said first cathode ray tube and passing from said object, means for amplifying said electrical signal to produce a first control signal and feed-back circuit means for transmitting said first control signal to said second cathode ray tube; and a second feedback loop including a second photosensitive element for producing a second electrical signal in response to said light beam emitted by said second cathode ray tube and passing from said second object, means for amplifying said electrical signal to produce a second control signal and feedback circuit means for transmitting said second control signal to said first cathode ray tube.

* * * * *